(12) United States Patent
Lansell et al.

(10) Patent No.: US 9,724,703 B2
(45) Date of Patent: *Aug. 8, 2017

(54) SYSTEMS AND METHODS FOR PROCESSING SOLID MATERIALS USING SHOCKWAVES PRODUCED IN A SUPERSONIC GASEOUS VORTEX

(71) Applicant: LLT International (Ireland) Ltd., New York, NY (US)

(72) Inventors: Peter Lansell, Kew (AU); William Keating, Fairfield (AU); David Lowe, Alphington (AU)

(73) Assignee: LLT International (Ireland) Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,877

(22) Filed: Jun. 6, 2014

(65) Prior Publication Data

US 2015/0352558 A1 Dec. 10, 2015

(51) Int. Cl.
*B01J 3/08* (2006.01)
*B01J 8/14* (2006.01)
(Continued)

(52) U.S. Cl.
CPC ................. *B02C 19/18* (2013.01); *B01J 3/08* (2013.01); *B01J 8/002* (2013.01); *B01J 8/14* (2013.01);
(Continued)

(58) Field of Classification Search
CPC .................................... B01J 19/10; B01J 3/08
(Continued)

(56) References Cited

U.S. PATENT DOCUMENTS 2,257,907 A * 10/1941 Griswold ...................... 502/431
2,532,554 A 12/1950 Joeck
(Continued)

FOREIGN PATENT DOCUMENTS

DE 102013019949 5/2015
EA 000004 B1 * 9/1997
(Continued)

OTHER PUBLICATIONS

English machine translation for RU 2029621 C1 (Feb. 1995).*
(Continued)

*Primary Examiner* — Jennifer A Leung
(74) *Attorney, Agent, or Firm* — Pillsbury Winthrop Shaw Pittman LLP (57) ABSTRACT

Solid materials may be processed using shockwaves produced in a supersonic gaseous vortex. A high-velocity stream of gas may be introduced into a reactor. The reactor may have a chamber, a solid material inlet, a gas inlet, and an outlet. The high-velocity stream of gas may be introduced into the chamber of the reactor through the gas inlet. The high-velocity stream of gas may effectuate a supersonic gaseous vortex within the chamber. The reactor may be configured to facilitate chemical reactions and/or comminution of solid feed material using tensive forces of shockwaves created in the supersonic gaseous vortex within the chamber. Solid material may be fed into the chamber through the solid material inlet. The solid material may be processed within the chamber by nonabrasive mechanisms facilitated by the shockwaves within the chamber. The processed material that is communicated through the outlet of the reactor may be collected.

25 Claims, 8 Drawing Sheets

(51) Int. Cl.
  B01J 8/16   (2006.01)
  B01J 19/10  (2006.01)
  B01J 19/26  (2006.01)
  B02C 19/18  (2006.01)
  B02C 19/06  (2006.01)
  B01J 8/00   (2006.01)

(52) U.S. Cl.
  CPC ............ B01J 8/16 (2013.01); B01J 19/10 (2013.01); B01J 19/26 (2013.01); B02C 19/06 (2013.01); B02C 19/186 (2013.01); *B01J 2208/00212* (2013.01); *B01J 2208/00415* (2013.01); *B01J 2208/00433* (2013.01); *B01J 2208/00442* (2013.01); *B01J 2208/00469* (2013.01); *B01J 2208/00504* (2013.01); *B01J 2208/00902* (2013.01); *B01J 2219/00761* (2013.01)

(58) Field of Classification Search
  USPC .................................................. 422/127, 128
  See application file for complete search history.

(56) References Cited

U.S. PATENT DOCUMENTS

| | | | |
|---|---|---|---|
| 2,752,097 | A | 6/1956 | Lecher |
| 2,997,245 | A | 8/1961 | Nilsson et al. |
| 3,178,121 | A * | 4/1965 | Wallace, Jr. ............ 241/5 |
| 3,254,848 | A | 6/1966 | Stephanoff |
| 3,301,292 | A | 1/1967 | O'Connor |
| 3,462,086 | A | 8/1969 | Bertrand et al. |
| 3,565,348 | A | 2/1971 | Dickerson et al. |
| 3,602,439 | A | 8/1971 | Nakayama |
| 3,908,904 | A | 9/1975 | Kerner et al. |
| 4,198,004 | A | 4/1980 | Albus et al. |
| 4,248,387 | A | 2/1981 | Andrews |
| 4,354,641 | A | 10/1982 | Smith |
| 4,515,093 | A * | 5/1985 | Beardmore et al. ........ 110/347 |
| 4,671,192 | A * | 6/1987 | Hoffert et al. ........ 110/347 |
| 4,919,853 | A | 4/1990 | Alvarez et al. |
| 4,921,173 | A | 5/1990 | Bartley |
| 5,219,530 | A | 6/1993 | Hertzberg et al. |
| 5,246,575 | A | 9/1993 | Alexander |
| 5,277,369 | A | 1/1994 | Moriya et al. |
| 5,306,330 | A | 4/1994 | Nasikas |
| 5,855,326 | A * | 1/1999 | Beliavsky ............ 241/5 |
| 6,089,026 | A | 7/2000 | Hu |
| 6,145,765 | A | 11/2000 | Capelle, Jr. et al. |
| 6,152,158 | A | 11/2000 | Hu |
| 6,158,676 | A | 12/2000 | Hughes |
| 6,167,323 | A | 12/2000 | Komino et al. |
| 6,824,086 | B1 | 11/2004 | Mazurkiewicz et al. |
| 7,137,580 | B2 | 11/2006 | Graham et al. |
| 7,398,934 | B1 | 7/2008 | Capelle, Jr. |
| 7,621,473 | B2 | 11/2009 | Capelle, Jr. |
| 7,789,331 | B2 | 9/2010 | Zehavi et al. |
| 7,850,105 | B2 * | 12/2010 | Ito et al. ............ 241/39 |
| 8,172,163 | B2 | 5/2012 | Soliman Abdalla et al. |
| 8,398,007 | B2 | 3/2013 | Ito et al. |
| 8,480,859 | B2 | 7/2013 | Kostrov et al. |
| 8,726,532 | B2 | 5/2014 | Hogan |
| 9,050,604 | B1 | 6/2015 | Lansell et al. |
| 2004/0063874 | A1 | 4/2004 | Muhle et al. |
| 2004/0200910 | A1 | 10/2004 | Graham et al. |
| 2007/0267527 | A1 | 11/2007 | Graham et al. |
| 2008/0226535 | A1 | 9/2008 | Park et al. |
| 2009/0241816 | A1 | 10/2009 | Taylor |
| 2010/0025506 | A1 | 2/2010 | Capelle, Jr. |
| 2010/0101978 | A1 | 4/2010 | Gordon et al. |
| 2011/0206593 | A1 | 8/2011 | Fahs, II et al. |
| 2011/0283705 | A1 | 11/2011 | Oliver |
| 2011/0303013 | A1 | 12/2011 | Kass et al. |
| 2012/0131901 | A1 | 5/2012 | Westervelt et al. |
| 2012/0230877 | A1 | 9/2012 | Pinchot |
| 2013/0221141 | A1 | 8/2013 | Zhang et al. |
| 2013/0315792 | A1 | 11/2013 | O'Dowd |
| 2013/0336845 | A1 | 12/2013 | Chu |
| 2014/0058095 | A1 | 2/2014 | Rende et al. |
| 2014/0058178 | A1 | 2/2014 | Bedard et al. |
| 2014/0275687 | A1 | 9/2014 | Beene et al. |
| 2015/0165414 | A1 | 6/2015 | Gattupalli et al. |
| 2016/0243488 | A1 | 8/2016 | Wells et al. |

FOREIGN PATENT DOCUMENTS

| | | | | |
|---|---|---|---|---|
| FR | 1048667 A | * | 12/1953 | ............ A23C 15/16 |
| GB | 1037770 | | 8/1966 | |
| RU | 2029621 C1 | * | 2/1995 | |
| RU | 2088336 C1 | * | 8/1997 | |
| WO | WO 9408719 A1 | * | 4/1994 | |
| WO | WO 9733695 A1 | * | 9/1997 | |
| WO | 2008/083138 | | 7/2008 | |

OTHER PUBLICATIONS

English machine translation for RU 2088336 C1 (Aug. 1997).*
English machine translation for FR 1048667 A (Dec. 1953).*
English translation for WO 97/33695 A1 (Sep. 1997), translated by Schreiber Translations, Inc., Mar. 2015.*
M. Reader-Harris. Orifice Plates and Venturi Tubes, Chapter 3: Venturi Tube Design. 2015. pp. 77-96.*
International Preliminary Report on Patentability and the Written Opinion of the International Searching Authority as issued in International Patent Application No. PCT/US2015/034554, dated Sep. 3, 2015.
International Preliminary Report on Patentability and the Written Opinion of the International Searching Authority as issued in International Patent Application No. PCT/US2015/034548, dated Sep. 8, 2015.
Hartmann, J. et al, "Synchronisation of Air-Jet Generators with an Appendix on the Stem Generator", Det Kgl. Danske Videnskabernes Selskab. Matematisk-fysiske Meddelelser, Bd. 26, No. 10, 1951(39 pages).
Demare, D., et al., "Acoustic enhancement of combustion in lifted non-remixed jet flames", The Combusion Institute, 139 (2004), 312-328, Elsevier, Inc.
Simpson, E., et al., Acoustic Performance of a Cylindrical Disk-Type Resonator, Journal of Sound and Vibration, (1978) 60(1), 151-156, Academic Press Inc. (London) Limited.
Narayanan, S., et al. "Acoustic characteristics of chamfered Hartmann whistles", Journal of Sound and Vibration, 330 (2011) 2470-2496, Elsevier, Ltd.
Narayanan, S. et al., Aero-acoustic features of internal and external chamfered Hartmann whistles: A comparative study, Journal of Sound and Vibration, 333 (2014) 774-787, Elsevier, Ltd.
Non-Final Office Action mailed Jul. 21, 2016 in corresponding U.S. Appl. No. 14/823,890 (13 pages).
Final Office Action mailed Jan. 27, 2017 in corresponding U.S. Appl. No. 14/690,149 (14 pages).
Final Office Action mailed Dec. 29, 2016 in corresponding U.S. Appl. No. 14/823,890 (14 pages).
Derwent abstract of DE 102013019949 A1.
International Search Report and Written Opinion mailed Sep. 26, 2016 in corresponding International Patent Application No. PCT/US2016/046641.

* cited by examiner

SYSTEMS AND METHODS FOR PROCESSING SOLID MATERIALS USING SHOCKWAVES PRODUCED IN A SUPERSONIC GASEOUS VORTEX

FIELD OF THE DISCLOSURE

This disclosure relates to systems and method for processing solid materials using shockwaves produced in a supersonic gaseous vortex.

BACKGROUND

Conventional approaches to comminution may include use of jet mills. Jet mills may be used for grinding a range of materials, particularly in cases where the feed material is hard or already relatively fine and where high purity products, without contamination, are required. Pulverization may take place in a central toroidal chamber of the jet mill as the process material is driven around the perimeter of the chamber by multiple jets of air or steam. No grinding media may be involved. Size reduction via attrition may be the result of high-velocity collisions and resulting compressive forces between particles of the process material itself and/or between particles of the processes material and interior walls of the chamber.

SUMMARY

One aspect of the disclosure relates to a system using a reactor configured to facilitate chemical reactions and/or comminution of solid feed materials using tensive forces from shockwaves created in a supersonic gaseous vortex. One or more implementations of the system using a reactor as presented herein may be particularly advantageous over conventional solutions where jet mills may be employed. For example, one or more implementations of the system presented herein may advantageously produce only minimal wear on components of the system. This may be due at least in part to the processing of solid materials being facilitated mainly by tensive forces from shockwaves within the reactor as compared to grinding and/or pulverization processing techniques used in conventional solutions. One or more implementation of the system presented herein may facilitate higher solid material throughput compared to one or more conventional solutions. One or more implementations of the system presented herein may facilitate solid material processing at greater power efficiency compared to one or more conventional solutions.

In one or more implementations, the system may comprise one or more of a solid material feeder, a reactor, a gas source, storage, and/or other components. The reactor may have a chamber, a solid material inlet, a gas inlet, and an outlet. The reactor may be configured to facilitate chemical reactions and/or comminution of solid feed material using tensive forces of shockwaves created in a supersonic gaseous vortex within the chamber. The solid material feeder may be configured to provide solid material into the chamber of the reactor through the solid material inlet. The solid material may be processed within the chamber by abrasive and/or nonabrasive mechanisms facilitated by the shockwaves within the chamber.

The gas source may be configured to introduce a high-velocity stream of gas into the chamber of the reactor through the gas inlet. The high velocity stream of gas may effectuate the supersonic gaseous vortex within the chamber. Storage may be configured to collect processed material that is communicated through the outlet of the reactor.

Another aspect of the disclosure relates to method of processing solid materials using shockwaves produced in a supersonic gaseous vortex. The method may comprise the steps of: introducing a high-velocity stream of gas into a reactor having a chamber, a solid material inlet, a gas inlet, and an outlet; providing solid material into the chamber through the solid material inlet; collecting processed material that is communicated through the outlet of the reactor; and/or other operations.

The high-velocity stream of gas may be introduced into the chamber of the reactor through the gas inlet. The high-velocity stream of gas may effectuate a supersonic gaseous vortex within the chamber. The reactor may be configured to facilitate chemical reactions and/or comminution of solid feed material using tensive forces of shockwaves created in the supersonic gaseous vortex within the chamber.

Solid material that is provided into the chamber through the solid material inlet may be processed within the chamber by abrasive and/or nonabrasive mechanisms facilitated by the shockwaves within the chamber.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
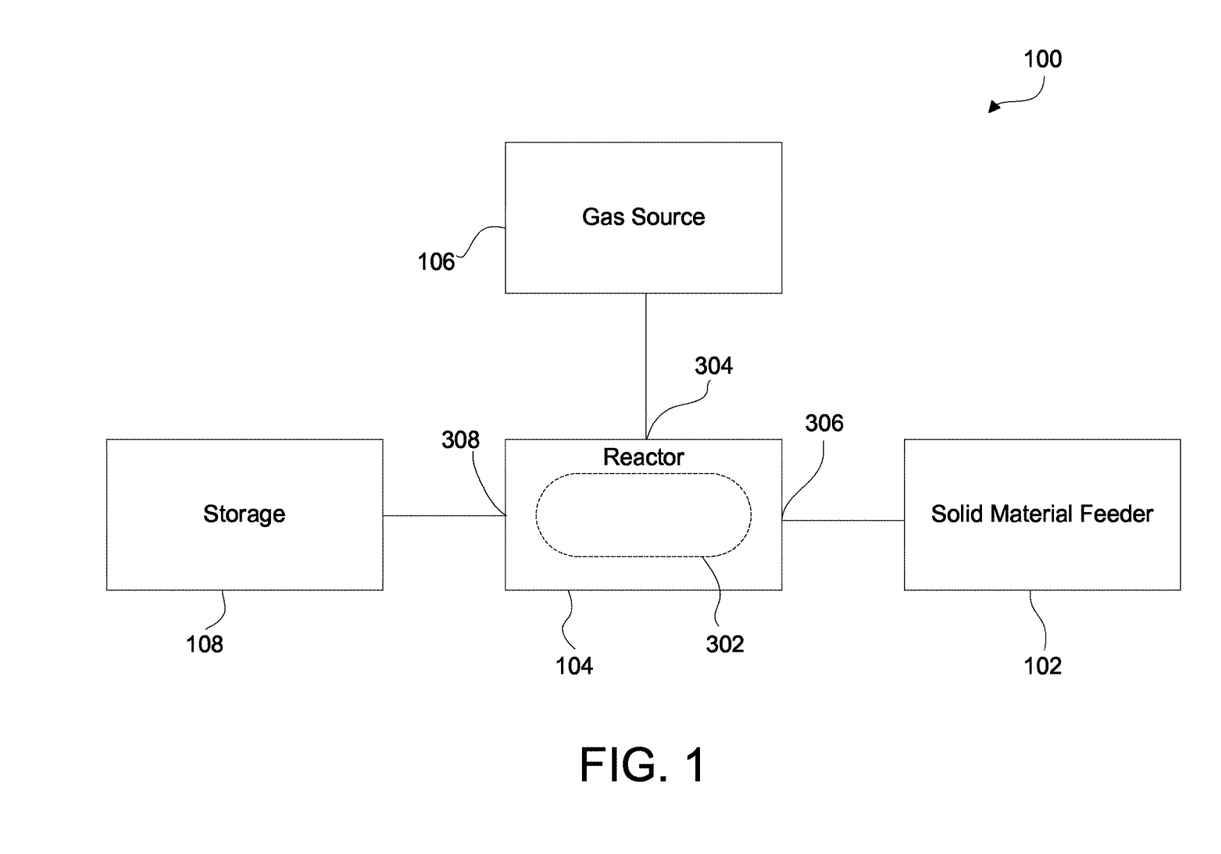
FIG. 1 illustrates a system for processing solid materials, in accordance with one or more implementations.

FIG. 1 illustrates a system 100 for processing solid materials, in accordance with one or more implementations. The system 100 may include one or more of a solid material feeder 102, a reactor 104, a gas source 106, storage 108, and/or other components. By way of non-limiting example, solid material that may be processed using system 100 may include one or more of soil, coal, woodchips, food scraps, ore and/or ore concentrate, mine tailings, tar sands, shale, an organic material, an inorganic material, cellulosic material derived from forestry and/or farm waste, domestic and/or industrial waste, paper cardboard and/or rag, medical waste, waste plastics, waste, glass, fly ash, siliceous byproducts, waste from metal refineries, waste from power stations, waste rubber, and/or other materials. Various illustrative examples of implementations of system 100 are presented herein. Briefly, solid material which is processed using system 100 may herein be referred to as "solid material", "solid feed material", "process material", "processing material", "solid process material", "solid processing material", "material for processing", "solid material for processing", and/or other term which designates a solid material that may be processed in accordance with one or more implementations presented herein.

Figure 3:
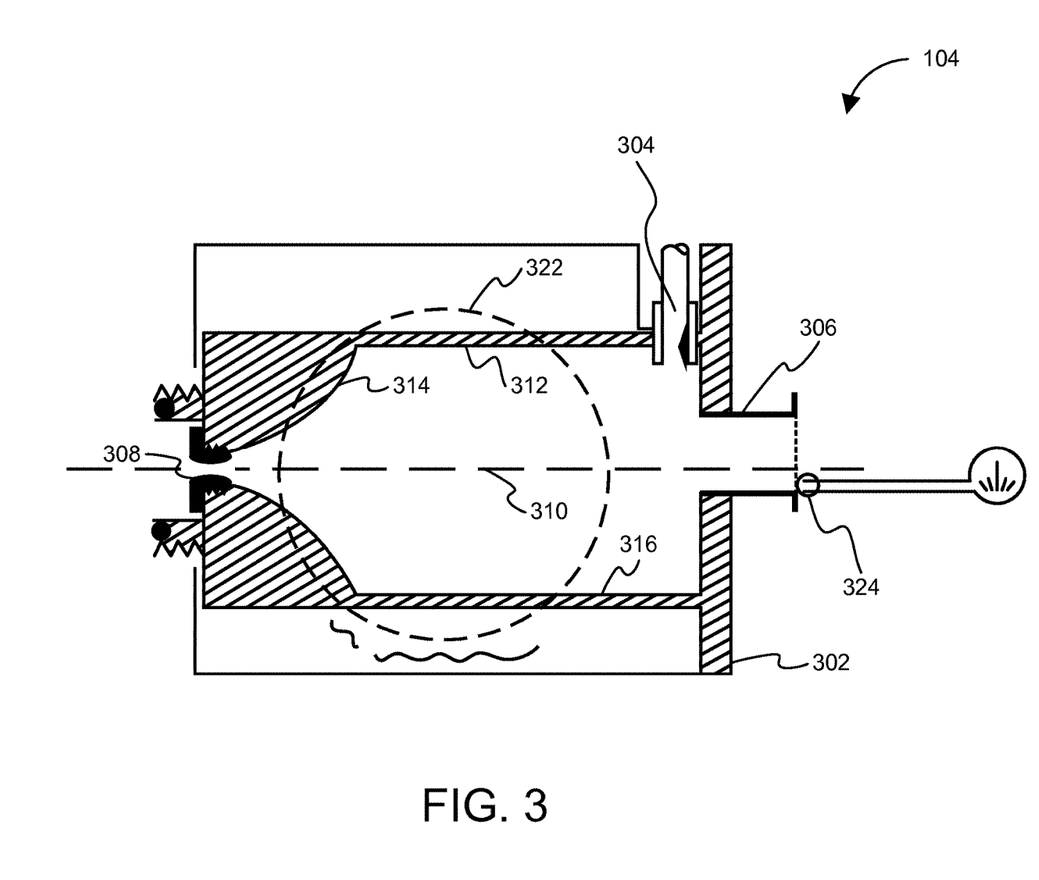
FIG. 3 illustrates a top view of a reactor used in the system of FIG. 1, in accordance with one or more implementations.

The reactor 104 may be being configured to facilitate chemical reactions and/or comminution of solid feed material using tensive forces of shockwaves created in a supersonic gaseous vortex within a chamber 302 of reactor 104. The reactor 104 may include a chamber 302, a gas inlet 304, a solid material inlet 306, an outlet 308, and/or other components. The solid material feeder 102 may be configured to provide solid material into chamber 302 of reactor 104 through solid material inlet 306 of reactor 104 for processing. The solid material may be processed within chamber 302 by abrasive and/or nonabrasive mechanisms facilitated by the shockwaves within chamber 302.

The reactor 104 may be a reactor configured to achieve one or more of the intended functions of reactor 104 as presented herein. For illustrative purposes, exemplary implementations of reactor 104 are presented herein with reference made to FIGS. 3-7. However, those skilled in the art may recognize other reactors and/or reactor types that may be suitable for the intended purposes presented herein, and are anticipated. In some implementations, system 100 may include one or more features (e.g., reactor 104) that is the same as or similar to one or more features described in U.S. patent application Ser. No. 14/298,868 filed Jun. 6, 2014 and entitled "A Reactor Configured To Facilitate Chemical Reactions And/or Comminution Of Solid Feed Materials", which is incorporated herein by reference.

The gas source 106 may be configured to introduce a high-velocity stream of gas into chamber 302 of reactor 104. The high-velocity stream of gas may be introduced through gas inlet 304 of reactor 104. The introduction of the high-velocity stream of gas may effectuate the supersonic gaseous vortex within chamber 302 of reactor 104. Herein, gas introduced into chamber 302 via gas inlet 304 may be referred to as "process gas", "processing gas", and/or other term that designates a gas that is introduced into reactor as a high-velocity stream of gas in accordance with one or more implementations presented herein.

The gas source 106 may include a system of conduits, valves, sensors, and/or other components that are configured to provide the high-velocity stream of gas from gas source 106 to reactor 104 in a controlled and/or otherwise predetermined manner.

Storage 108 may be configured to collect processed material that is communicated through outlet 308 of reactor 104.

Figure 2:
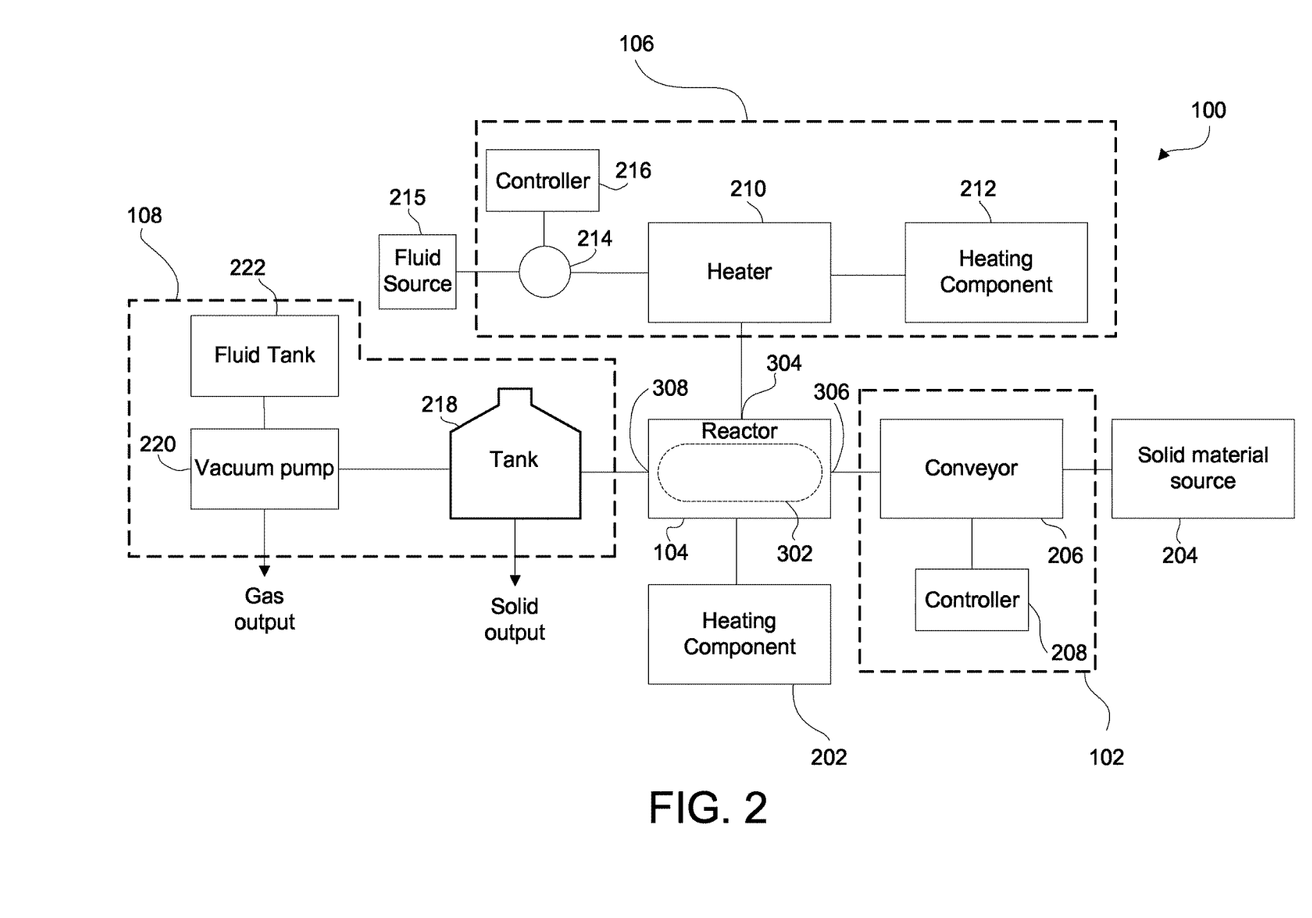
FIG. 2 illustrates the system of FIG. 1, in accordance with one or more implementations.

FIG. 2 illustrates system 100 for processing solid materials, in accordance with one or more implementations. Consistent with FIG. 1, system 100 may include one or more of solid material feeder 102, reactor 104, gas source 106, storage 108, and/or other components. For example, system 100 may include a heat component 202 configured to provide heat to chamber 302 of reactor 104. In some implementations, heat component 202 may be integrated with reactor 104 and may comprise part of reactor 104. In some implementations, heat component 202 may separate from reactor 104.

Solid material feeder 102 may comprise a conveyor 206. The conveyor 206 may be configured to receive and/or draw solid processing materials from a solid material source 204. The conveyor 206 may be configured to provide the solid processing materials to reactor 104 via solid material inlet 306. The conveyor 206 may be configured to advance the solid material from solid material source 204 through solid material inlet 306 and into chamber 302. In some implementations, the conveyor 206 may be attached to the solid material inlet 306. The attachment may be configured to provide a high pressure seal with the solid material being fed into solid material inlet 306. The conveyor 206 may include one or more of a belt conveyor, an auger conveyor (e.g., a double screw auger), a pneumatic conveyor, a vibrating conveyor, a chain conveyor, a pneumatic conveyor (e.g., such as those used in continuous sand blasting operations and/or other operations), a double chamber pneumatic conveyor, a rotary conveyor, a rotary airlock, a chain and disk conveyor, a reciprocating ram system, and/or other type of conveyor and/or conveyance system.

In some implementations, solid material source 204 may be integrated as part of solid material feeder 102 (e.g., conveyor 206). In some implementations, solid material source 204 may be separate from the solid material feeder 102. In some implementations, solid material source 204 may be configured in other ways. The solid material source 204 may comprise one or more of a tank, a bin, a canister, a loader, a pressurized tank, a slurry tank, a hopper, and/or other source of solid materials (e.g., solid material may be fed by hand into conveyor 206 and/or by other techniques to provide solid material to the conveyor 206).

In some implementations, conveyor 206 may be controlled by a controller 208. The controller 208 may be a computer controller, a variable-frequency drive controller, one or more physical processors, a programmable logic controller (PLC), a controller including a genetic algorithm and/or other algorithm that optimized performance, and/or other type of controller and/or controller system. For example processors may include one or more of a digital processor, an analog processor, a digital circuit designed to process information, an analog circuit designed to process information, a state machine, and/or other mechanisms for electronically processing information. The controller 208 may be configured to control conveyor 206 to advance solid materials into reactor 104 based on a predetermined, flow rate, capacity, speed, and/or based on other control parameters. The controller 208 may be configured to control conveyor 206 to advance solid material into rector 104 in a manner that is in accordance with one or more implementations of processing using system 100 presented herein and/or other implementations of processing solid materials.

In some implementations, gas source 106 may comprise one or more of a heater 210, a heating component 212, a fluid pump 214, a controller 216, and/or other components. The heater 210 may be heated by a heat source provided by heating component 212. The heater 210 may comprise one or more of a furnace, a boiler, a superheater, a device configured to be heated from exhaust gases of system 100, and/or other heater and/or heating device. In some implementations, heater 210 may comprise a superheater, and/or other components. In some implementations, heater 210 may comprise a boiler and a superheater, and/or other components.

The heating component 212 may include one or more of a gas burner, an electrical coil, an induction heater, a dielectric heater, a radiofrequency heater, a microwave heater, a steam jacket, a molten salt bath, a pulverized fuel burner, a glow discharge plasma, a travelling wave plasma, a thermal and/or non-thermal plasma and/or other components configured to provide heat to heater 210. In some implementations, the heat provided by heating component 212 may be controlled such that the process gas communicated from heater 210 into reactor 104 meets a desired temperature. In some implementations, the heat provided by heating component 212 may be controlled such that the process gas communicated from heater 210 into reactor 104 meets a desired temperature range. In some implementations, the heat provided by heating component 212 may be controlled such that the process gas communicated from heater 210 into reactor 104 meets a desired pressure. In some implementations, the heat provided by heating component 212 may be controlled such that the process gas communicated from heater 210 into reactor 104 meets a desired pressure range.

A fluid may be introduced into heater 210 which may be used to produce the process gas (e.g., the high-velocity stream of gas that is introduced into reactor 104). For example, fluid may be communicated through heater 210 via fluid pump 214 using a system of conduits and/or other fluid communication techniques. The fluid may be provided from a fluid source 215. The fluid source 215 may be internal or external to gas source 106. The fluid may comprise, for example, coal gas, town gas, methane, water (e.g., to produce steam), steam, ethane, propane, butane, pentane, ammonia, hydrogen, carbon monoxide, carbon dioxide, oxygen, nitrogen, chlorine, fluorine, ethene, hydrogen sulphide, acetylene, and/or other fluid that may be used to produce the high-velocity stream of gas that is introduced into the reactor 104 to facilitate processing of the solid materials in accordance with one or more implementations presented herein. The heater 210 may be configured to elevate the temperature and pressure of the fluid to a desired temperature and/or pressure that is determined for the process gas in accordance with one or more implementations. Communicating the process gas from heater 210 into reactor 104 through the gas inlet 304 may facilitate the high-velocity stream of gas in the chamber 302.

In some implementations, depending on the desired result, in the processing of lignite coal, for example, it may be desired to merely dry the coal, and the process gas temperature (such as steam) may be marginally above or below 100° C., depending on the degree of vacuum in the collecting chamber. It may be desired to drive off the volatiles from the lignite coal, and then the temperature of the process gas may be varied up to about 250° C. and/or other temperature. In some implementations, if carbon black or Fullereens are desired, then the temperature may be in the range of 250° C. to 400° C. and/or other range. If total gasification is desired, then the process gas temperature may be in the range 400° C. to 700° C. (or greater), depending on the type of coal and/or the desired degree of gasification. If a balanced gas mix is desired for Fisher-Tropsch type reaction and/or other reaction (e.g., one part carbon monoxide (CO) and two parts hydrogen ($2H_2$), then a mixture of steam, methane and/or oxygen and/or air may be used as the process gas to create a self-reaction temperature in the range of 250° C. to 700° C. and/or other range.

In some implementations, fluid pump 214 may be controlled by controller 216. The controller 216 may be a computer controller, a variable-frequency drive controller, one or more physical processors, and/or other type of controller and/or controller system. For example, processors may include one or more of a digital processor, an analog processor, a digital circuit designed to process information, an analog circuit designed to process information, a state machine, and/or other mechanisms for electronically processing information. The controller 216 may be configured to control fluid pump 214 to advance the fluid through heater 210 and into reactor 104 based on a predetermined, flow rate, temperature, pressure, volume, speed, and/or other control parameter. The controller 216 may be configured to control fluid pump 214 to advance the fluid into rector 104 in a manner that is in accordance with one or more implementations of processing solid materials using system 100 as presented herein.

In some implementations, gas source 106 may include a network of conduits, sensors, valves, controllers, check valves, and/or other components that are connected to fluid pump 214, heater 210, burner 212, and/or gas inlet 304 of reactor 104 that are configured to carry out one or more of the features and/or functions attributed to gas source 106 as presented herein. For example a non-return check valve may be disposed at a portion of conduit communicating between fluid pump 214 and heater 210 to ensure the fluid does not backflow into fluid pump 214. Other configurations of conduits, valves, controllers, and/or other components may be employed.

In some implementations, one or more features and/or functions of fluid pump 214 may be attributed to one or more other components. For example, in some implementations, fluid pump 214 may be omitted, and replaced with a computer controlled valve (not shown). In such implementations, fluid supplied from fluid source 215 may be supplied based on one or more of a pressure, flow rate, volume, and/or other parameters. The controlled valve may be configured to control the pressure, flow rate, volume, and/or other parameter of the fluid that is introduced into heater 210 though cooperative opening and/or closing of the valve in predetermined amounts and/or frequency in order to achieve similar control as described for fluid pump 214 (e.g., with control being facilitated by controller 216).

In some implementations, storage 108 may comprise a tank 218 and a vacuum source, such as a vacuum pump 220. The tank 218 may be in fluid communication with the vacuum source (e.g., vacuum pump 220). In some implementations, vacuum pump 220 may comprise a liquid ring pump and/or other pump. In some implementation, vacuum pump 220 may be a turbo molecular pump and/or other pump. The vacuum source may be configured to create a vacuum pressure within tank 218. A vacuum pressure within tank 218 may facilitate drawing of processed material from outlet 308 of reactor 104 during processing. In some implementations, the vacuum pressure may be in the range 20 mm of mercury to 760 mm of mercury (e.g., 3 KPa to 101 KPa) and/or other range.

In some implementations, vacuum pump 220 may include a fluid tank 222. The fluid tank 220 may include cooling fluid for the vacuum pump 220. The cooling fluid may be water and/or other fluid. The fluid tank 222 may comprise a water tank. In some implementations, fluid tank 222 may comprise a fluid reservoir for vacuum pump 220. In some implementations, the fluid tank 222 and/or vacuum pump 220 may be configured to provide a mechanism for quenching any exhaust gasses and/or condensing steam and/or volatiles. However, in some implementations of system 100, there may be no need for a negative pressure at output 308 of the reactor 304 such that the vacuum source such as vacuum pump 220 and/or fluid tank 222 may be omitted from system 100. In some implementations, vacuum pump 220 and/or fluid tank 222 may be omitted from system 1000 so as to avoid moisture in the process and a different style of vacuum source may be employed. In some implementations, a low vacuum pressure may be achieved by an extraction/exhaust fan operatively coupled to tank 218 and/or outlet 308 of reactor 304. In some implementations, exhaust gases may be quenched through the provision of a cooling tower and/or other gas cleanup equipment employed with system 100. Other configurations of a vacuum source and/or quenching system are contemplated.

Herein, material which has been processed through system 100 (e.g., process gas and solid process material) may be referred to as the "processed materials" and/or other terms that designate materials that have gone through one or more processing procedures (e.g., fluids and solids). As such, the processed materials may include processed solids and processed gases (e.g., exhaust gases). The processed materials may be communicated into tank 218 wherein processed solids may be de-entrained (e.g., separated) from the exhaust gases. The solid materials may be maintained in tank 218 and/or later removed from tank 218 via a solid material output of tank 218. Exhaust gases may pass through vacuum pump 220 and may be quenched in the fluid present in fluid tank 222. In some implementations, exhaust gases may be redirected into heater 210 to be flared.

In accordance with one or more implementations of system 100, process gas may be heated to a predetermined temperature and/or pressure and passed into reactor 104 at supersonic speeds to facilitate the high-velocity stream of gas within chamber 302. Solid materials may be provided into reactor 104 (e.g., chamber 302) wherein the solid materials interact with the high-velocity stream of gas. Chemical reactions and/or comminution of the solid materials may occur.

In accordance with one or more implementations, system 100 may be employed for one or more of the production of carbon, metals such as aluminum, magnesium, titanium and/or other metals, volatiles, fullerenes, carbon nanotubes, graphene, graphite, Bucky balls, silicon nanotubes (SNTs), silicene, silicon Bucky balls, magnetic carbon nanotubes, magnetic silicon nanotubes, any or all elements such as carbon, silicon, germanium, tin, lead, flerovium, and/or other element which may have the potential to form nano-structures of a similar nature as fullerenes, nano-structures and/or crystals formed from other elements and/or a combination thereof, Portland cement, silicates, metal doped SNTs, metallurgical carbon, hydrogen, sodium silicates, calcium silicates, potassium silicates, and/or other silicates, sugars from cellulosic materials, alcohols from cellulosic materials, activated charcoal, carbon black, fluorinated hydrocarbons, and/or other materials and/or products.

In some implementations, system 100 may be employed for processes such as one or more of carbon dioxide free power generation, gas production from coal for transportation, processing shale oil and/or tar sands, cracking long chain hydrocarbons, low temperature conversion of hydrocarbons into producer gas, combustion/gasification of fuels high in sulphur and/or chlorine, single stage production of metal powder(s), direct reduction of silicon, processing of refractory tailings, resource recovery and/or gasification of household waste, metal recovery from waste, destruction of persistent organic pollutants (POP), poly chlorinated biphenyls (PCB), poly aromatic hydrocarbon (PAH), chemical warfare waste, and/or other contaminates, car flock gasification and/metal recovery, tire processing, waste timber and/or farm waste gasification, removal of heavy metal from contaminated sites, conversion of asbestos, reclamation of material such as landfill sites, palm waste, forestry waste, glass waste, cement and/or cement products waste, sewage, and/or other waste, hydrogen production, and/or for other processes and/or procedures.

In some implementations, processing solid materials with gaseous medium may provide for the direct reduction of metals. For example, using coal and/or methane as a carbon source, chemical reactions occurring in chamber 302 may produce carbothermic reduction of metal oxides and/or sulphates to their metallic state. As an illustrative example, a processing procedure may include iron oxide as the solid processing material and methane as the process gas. Oil may be added to the iron oxide. The oil may or may not be an alcohol soluble oil.

As another illustrative example, lead sulphate leach concentrate (LSLC) may be used with an oil as lubricant as the solid processing material with methane and/or other gas as the process gas. Results may indicate that a single step reduction of up to 40% sulphate conversion (in the lead, cadmium, and zinc target species), may occur. These and/or similar processes may be run with reactor 104 heated to a range approximately between 200° C. and 700° C. (and/or other range) and the process gas at a temperature between 300° C. and 600° C. (and/or other range). For example, reactor 104 may be heated to below 670° C. and the process gas may be heated to below 500° C.

In some implementations, processing of solid materials using system 100 may be accomplished using steam as the process gas. Processes of this type may include, without limitation, devolatilizing coal, gasifying coal, decontaminating soil contaminated with hydrocarbons, decontaminating soil contaminated with poly chlorinated biphenyls (PCBs), and/or other processes and/or procedures.

In accordance with one or more implementations, water may be pumped into heater 210 and converted to steam as the process gas. The steam may be superheated up to temperatures in the range of 500° C. and 600° C. (and/or other range). For example the steam may be heated to approximately 550° C. The high temperature steam used as the process gas may be introduced at high-velocity into reactor 104 at gas inlet 304. Solid material may be provided into chamber 304 at material inlet 306. Various other conditions of system 100 may be tuned to achieve desired chemical inside reactor 104. For example, in some implementations, methane and/or other hydrocarbon gases and/or liquids may be added along with air and/or oxygen to make and/or assist in the chemical and/or attrition reaction.

In some implementations, super-heated Nitrogen may be used as the process gas with titanium, for example, used as the solid feed material providing titanium nitride powder as the output. This procedure may be applied to the range of carbides, silicides, borides and/or nitrides either with single metals like aluminum, titanium, tungsten and/or various other hard metals and/or non-metals.

In accordance with one or more implementations, PCBs may thermally decompose due to the high temperatures using one or more implementations of system 100 presented herein. Contamination levels of the processed material may indicate a reduction of PCB contamination. For example, experimentation may show that contamination may be reduced from 300 ppm to below 1 ppm (e.g., essentially undetectable) in accordance with one or more implementations. Levels of contamination of exhaust gas in water tank 222 at then of processing may also be below the detectable level. This may indicate that the PCBs are destroyed and not just boiled off. In some implementations, the reaction temperatures may be below that for the formation of dioxins, which may be produced in the reaction between chlorine and carbon monoxide at temperatures approximately in excess of 500° C. In some implementations, one or more problems conventionally associated with the destruction of PCB's and/or various other persistent toxic materials, such as chemical warfare agents, may be avoided.

In accordance with one or more gasification processes, particular consideration may be given to the steam to coal ratio in order to achieve desired $CO:H_2$ ratios for direct energy generation, gas to liquids processing, and/or other uses. Further modification of the $CO:H_2$ ratio may be achieved through a water gas shift reaction as represented by the following equation:

$$CO+H_2O \rightarrow H_2+CO_2$$

In some implementations, processing may be performed with multiple passes of material through system 100. For example, molecular hydrogen ($H_2$) may be produced from coal and/or other carbon containing solid, in accordance with one or more implementations. A carbon based solid material (e.g., coal) may be processed using system 100 with water (e.g., steam) and/or other fluid(s) as the process gas. An exhaust gas of the processed materials after a first pass using steam may include carbon monoxide. The chemical reaction of the first pass may be represented by the following equation:

$$C+H_2O \rightarrow CO+H_2$$

The carbon monoxide may be compressed for use during a second pass through system 100. The compressed carbon monoxide may be used as the process gas in the second pass. The second pass may use iron oxide as the solid process material. The second pass may produce a solid iron powder. The chemical reaction may be represented by the following equation:

$$FeO+CO \rightarrow Fe+CO_2$$

A third pass may be performed using the iron powder as the solid process material and steam as the process gas. The processing may produce molecular hydrogen. The reaction may be represented by the following equation:

$$Fe+H_2O \rightarrow FeO+H_2$$

In accordance with one or more implementations, system 100 may facilitate the production of carbonyls and/or other organometallic compounds using metal powders and/or metal-containing compound (including but not limited to ores, concentrates, hydrides, sulphates, sulphides, oxides, and/or chlorides) as the solid process material and/or carbon monoxide and/or other gas as the process gas. A variation of this process may be configured such that nickel oxide is reacted with carbon monoxide to produce nickel tetra-carbonyl. This may be a clear colorless liquid with a boiling point of approximately 105° C. that may be decomposed on a hot surface producing pure metallic nickel. A similar reaction may be used for Iron and may produce iron penta-carbonyl, however, may require higher temperatures and/or pressures.

A Nickel and Iron reaction may be represented by the following equation:

$$Ni+4CO \rightarrow Ni(CO)_4$$

and/or $$Fe+5CO \rightarrow Fe(CO)_5$$

In some implementations, carbonyls may be the basis of the integrated circuit industry where they are used in a process that is generically called Chemical Vapor Deposition (CVD). Most, if not all metals may be processed into carbonyls and/or other organometallic compounds either for further purification and/or as a method of depositing the metal of choice. Silicon may be readily converted into a carbonyl and then may be distilled and/or reduced to give very high purity at a fraction of the cost of the current "Choralski" melt pull systems and/or other systems. Such systems may be time consuming and/or very energy intensive. Some or more of the problems associated with these or similar systems may be alleviated by using one or more processes in accordance with system 100 as presented herein and/or other considerations.

In accordance with one or more implementations, system 100 may facilitate the production of Portland cement (di- and/or tri-calcium silicate). The system 100 may employ limestone as the solid process material and water (e.g., steam) as the process gas as the first step in the process. However, in one or more other implementations, carbon dioxide or other gas may be employed as the process gas since the process gas in this process may merely facilitate heat transfer during the reaction. The reaction may be represented by the following equation:

$$CaCO_3+H_2O \rightarrow CaO+H_2O+CO_2$$

In some implementations, a second step and/or other steps may combine three parts calcium oxide with one part of silicon dioxide as the solid feed material together with a process gas of choice producing a fine amalgamated powder which has the composition of TriCalcium Silicate (e.g., Portland cement).

Figure 4:
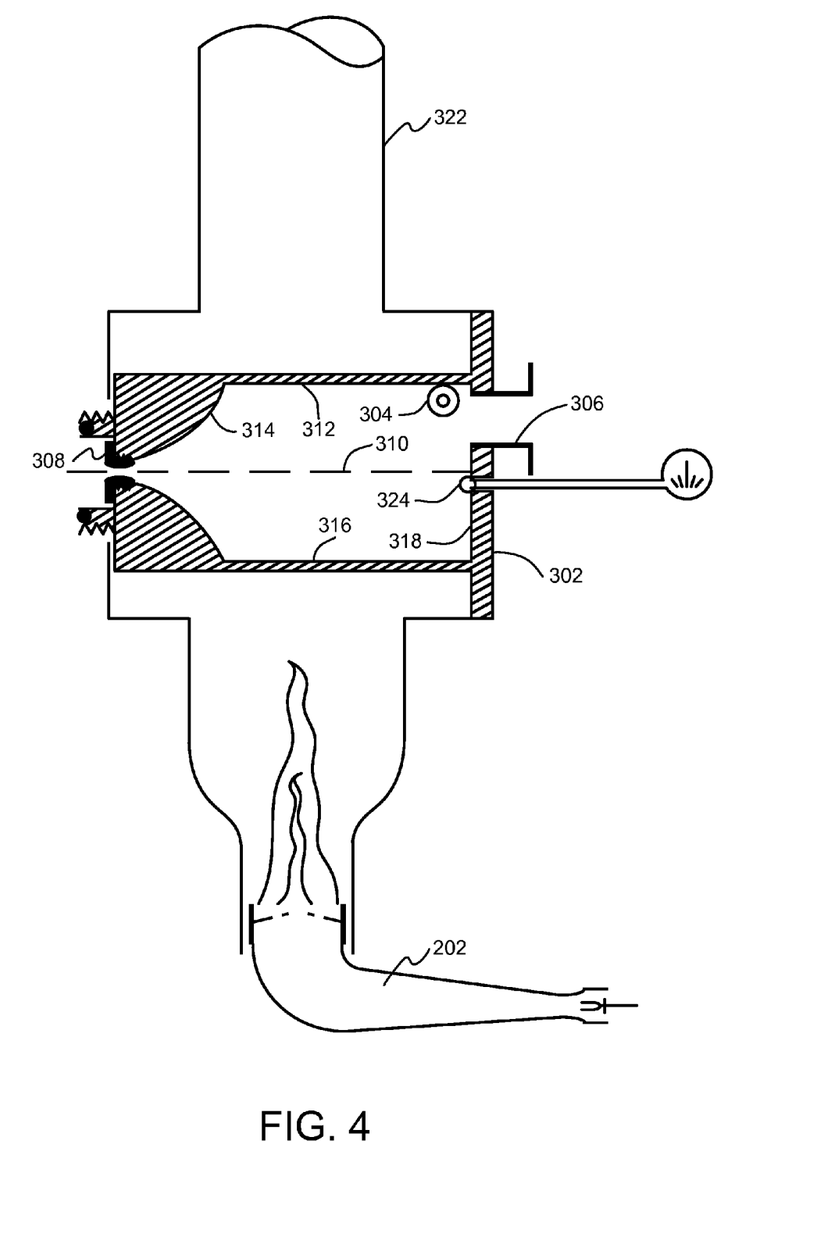
FIG. 4 illustrates a side view of the reactor of FIG. 3, in accordance with one or more implementations.
Figure 5:
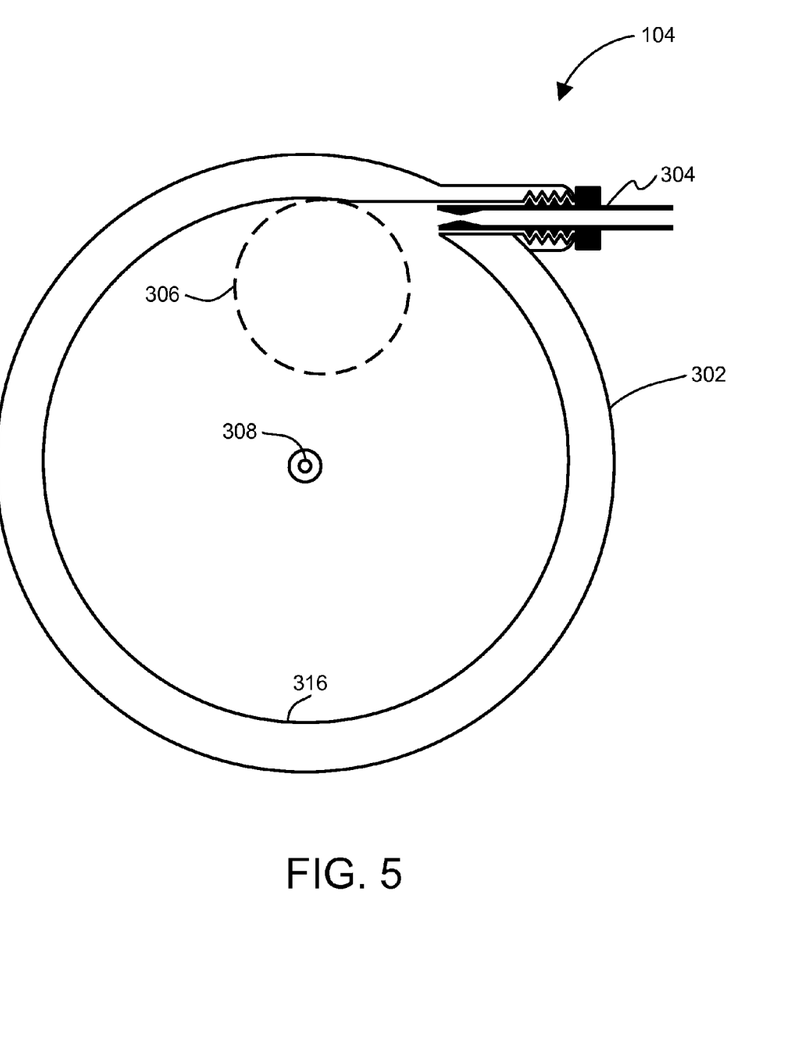
FIG. 5 illustrates a rear view of the reactor of FIG. 3, in accordance with one or more implementations.

FIGS. 3, 4, and 5 respectively illustrate a top view, a side view, and a rear view of reactor 104, in accordance with one or more implementations. The reactor 104 may be configured to facilitate processing including chemical reactions and/or comminution of solid feed materials using shockwaves created in a supersonic gaseous vortex, in accordance with one or more implementations of system 100. The reactor 104 may include one or more of chamber 302, gas inlet 304, material inlet 306, outlet 308, and/or other components.

The chamber 302 may be configured to provide a volume in which material processing occurs. The chamber 302 may have a substantially circular cross-section centered on a longitudinal axis 310 that is normal to the cross-section. The substantially circular cross-section may facilitate a vortex rotating within chamber 302. A portion 312 of chamber 302 may be shaped as a cylinder. A radius of the substantially circular cross-section of a portion 314 of chamber 302 may continuously decreases at an end of chamber 302 proximal to outlet 308. The continuous decrease of the radius of the substantially circular cross-section of chamber 302 may be configured to cause an acceleration of a rotational speed of the gaseous vortex. The portion 314 of chamber 302 having the continuously decreasing radius of the substantially circular cross-section may be shaped as a cone, a hemisphere, a horn-shape (see, e.g., FIGS. 3 and 4), and/or other shapes.

The chamber 302 may be formed of various materials. The chamber 302 may be formed of a ridged material. The chamber 302 may be formed of a thermally conductive material. The chamber 302 may be formed of an electrically conductive material. According to some implementations, chamber 302 may be formed wholly or partially of steel, iron, iron alloys, silicon carbide, partially stabilized zirconia (PSZ), fused alumina, tungsten carbide, boron nitride, carbides, nitrides, ceramics, silicates, geopolymers, metallic alloys, other alloys, and/or other materials. In some implementations, an internal surface 316 of chamber 302 may be coated with one or more coatings. An exemplary coating may be configured to prevent physical or chemical wear to internal surface 316 of chamber 302. In some implementations, a coating may be configured to promote a chemical reaction within chamber 302. An example of a coating that may promote a chemical reaction may include one or more of iron; nickel; ruthenium; rhodium; platinum; palladium; cobalt; other transition metals and their alloys, compounds, and/or oxides (e.g., the lanthanide series and their compounds, alloys, and/or oxides), and/or other materials.

The gas inlet 304 may be configured to introduce a high-velocity stream of gas into chamber 302. The gas inlet 304 may be disposed and arranged so as to effectuate a vortex of the stream of gas circulating within chamber 302. The vortex may rotate about longitudinal axis 310 of chamber 302. The gas inlet may be disposed so that the stream of gas is directed substantially perpendicular to longitudinal axis 310 of chamber 302. The gas inlet 304 may be disposed so that the stream of gas is directed substantially tangent to an internal surface of the substantially circular cross-section of the chamber (see, e.g., FIG. 5). The gas inlet 304 may be disposed proximal to material inlet 306.

The gas emitted by gas inlet 304 may include any number of gaseous materials. In some implementations, the gas may include a reduced gas, i.e., a gas with a low oxidation number (or high reduction), which is often hydrogen-rich. The gas may include one or more of steam, methane, ethane, propane, butane, pentane, ammonia, hydrogen, carbon monoxide, carbon dioxide, oxygen, nitrogen, chlorine, fluorine, ethene, hydrogen sulphide, acetylene, and/or other gases. The gas may be a vapor. The gas may be superheated in accordance with one or more implementations of system 100 presented herein. In some implementations, the gas may be heated beyond a critical point and/or compressed above a critical pressure so that the gas becomes a superheated gas, compressible fluid, and/or a super critical fluid.

Figure 6:
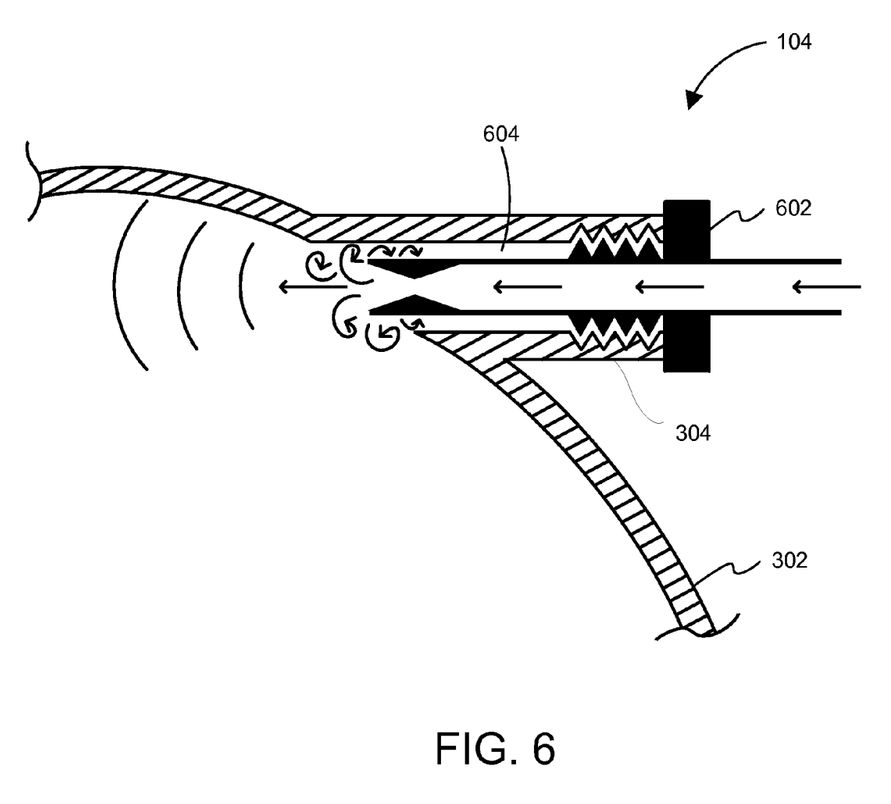
FIG. 6 illustrates a detailed view of a gas inlet of the reactor of FIG. 3, in accordance with one or more implementations.

FIG. 6 illustrates a detailed view of a gas inlet 304 of reactor 104, in accordance with one or more implementations. The gas inlet 304 may include an inlet nozzle 602 disposed within gas inlet 304. The inlet nozzle 602 may be configured to be secured in place by screw threads, and/or by other attachment techniques. The inlet nozzle 602 may be configured to accelerate the stream of gas being introduced into chamber 302. In exemplary implementations, inlet nozzle 602 may be configured to emit the stream of gas at a supersonic speed. The inlet nozzle 602 may be configured to emit shock waves in the stream of gas emitted from inlet nozzle 602. The gas inlet 304 may include an annular cavity 604 disposed about inlet nozzle 602. The annular cavity 604 may be configured such that the stream of gas emitted from inlet nozzle 602 resonates within annular cavity 604.

Figure 7:
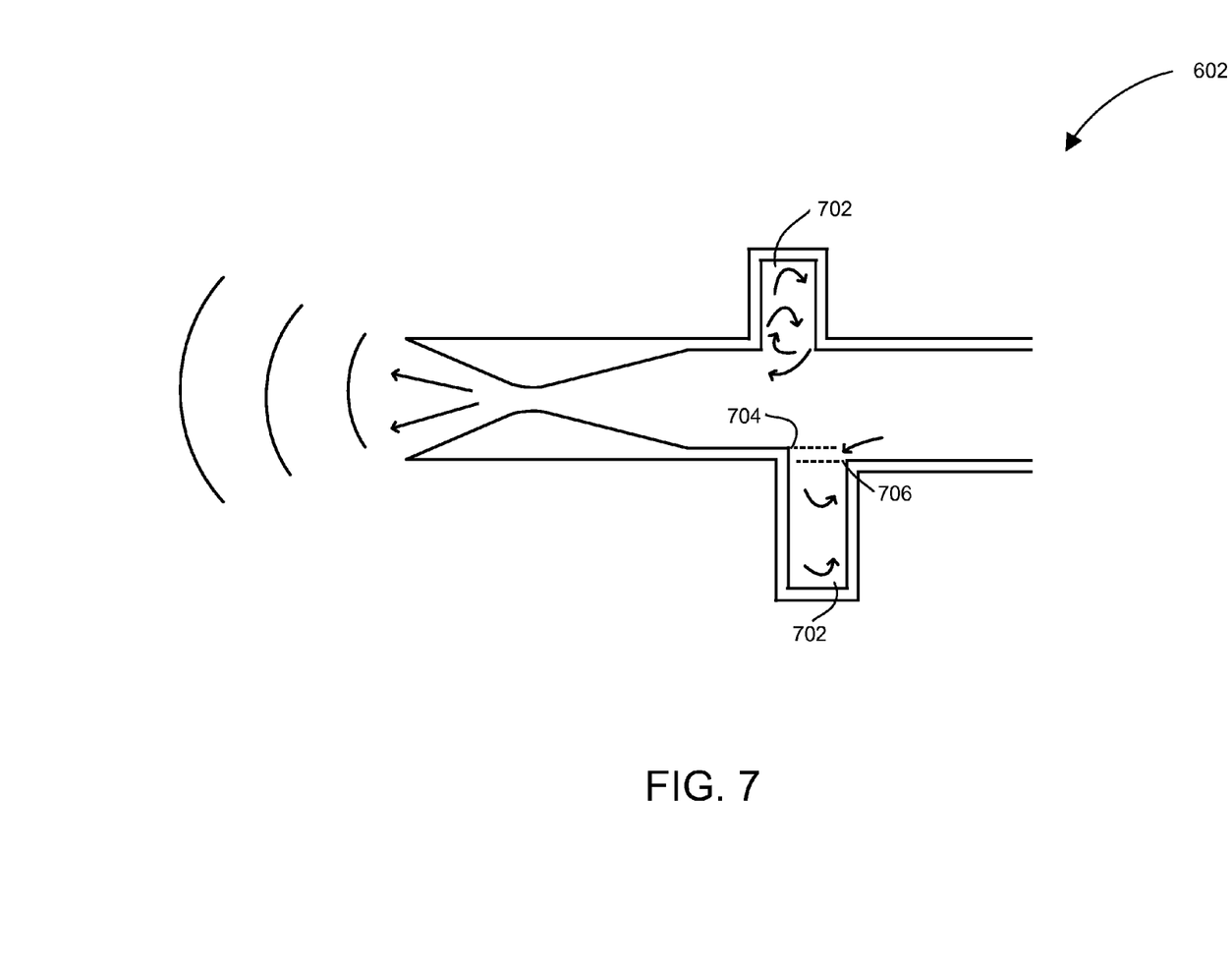
FIG. 7 illustrates a detailed view of an inlet nozzle of the gas inlet of FIG. 6, in accordance with one or more implementations.

FIG. 7 illustrates a detailed view of inlet nozzle 602 of gas inlet 304, in accordance with one or more implementations. The inlet nozzle 602 may include one or more resonator cylinders 702. A given resonator cylinder 702 may be disposed within inlet nozzle 602 and may be oriented perpendicular to the main flow of gas through inlet nozzle 602. A given resonator cylinder 702 may be configured such that gas pressure pulses resonate within the given resonator cylinder 702 to induce shock waves within inlet nozzle 602. Shock waves occurring within inlet nozzle 602 may propagate out of inlet nozzle 602 into chamber 302. Different resonator cylinders 702 may have different sizes so that corresponding different resonant frequencies result in shock waves occurring at different frequencies. Offset of a lip 704 relative to another lip 706 of a given resonator cylinder 702 may induce pumping in the given resonator cylinder 702.

According to some implementations, inlet nozzle 602 may be configured to introduce a shockwaves and/or harmonics in the gas and/or chamber 302. The inlet nozzle 602 may include one or more of a Hartmann-Sprenger tube, a Hartmann generator, a Hartmann oscillator, a nozzle utilizing one or more electronically controlled piezoelectric or magnostrictive transducers to control the shockwaves, and/or other types of nozzles. A Hartmann generator may include a device in which shock waves generated at the edges of a nozzle by a supersonic gas jet resonate with the opening of a small cylindrical pipe, placed opposite the nozzle, to produce powerful ultrasonic sound waves. A Hartmann oscillator may include a gas-jet radiator of sonic and ultrasonic waves. The oscillator may include a nozzle from which gas under a pressure $p>0.2$ meganewtons per square meter (1.93 atmospheres) emerges at supersonic speed. In the process, the gas jet may create compression and rarefaction waves. If a resonator is placed in this flow coaxially with the nozzle at a certain distance, sonic and ultrasonic waves may be radiated. The frequency of the acoustic radiation may be a function of the distance between the nozzle and the resonator, as well as the size of the resonator. Hartmann oscillators may radiate up to several dozen watts of acoustic power. If compressed air (from a tank or compressor) is blown through the nozzle, frequencies ranging from 5 or 6 kilohertz up to 120 kilohertz may be obtained. By using hydrogen in place of air, frequencies up to 500 kilohertz may be reached.

Referring again to FIGS. 3, 4, and 5, material inlet 306 may be configured to introduce solid material to be processed into chamber 302. The material inlet 306 may be disposed proximal to gas inlet 304. The material inlet 306 may be disposed on a flat surface 318 of chamber 302 that is perpendicular to longitudinal axis 310 of chamber 302. The material inlet 306 may be disposed so that material introduced into chamber 302 is directed parallel to longitudinal axis 310 of chamber 302. The material inlet 306 may be coupled to the solid material feeder 102 (FIGS. 1 and 2) that advances material through material inlet 306 into chamber 302.

Any number of materials may be processed by system 100 using reactor 104, and/or other reactor. According to some implementations, the material to be processed may include a solid, a fluid, a liquid, a vapor, a gas, a plasma, a supercritical fluid, a mixture including one or more of the aforementioned materials, and/or other types of materials. By way of non-limiting example, the material to be processed within chamber 302 may include one or more of soil, coal, woodchips, food scraps, ore and/or ore concentrate, mine tailings, tar sands, shale, an organic material, an inorganic material, and/or other materials presented herein and/or other materials.

In some implementations, material processed by system 100 may be processed by nonabrasive mechanisms facilitated by shockwaves within chamber 302. In some implementations, material processed by system 100 may be processed by abrasive mechanisms facilitated by shockwaves within chamber 302. For example, the material may be processed by tensile forces caused by shockwaves within chamber. The material may be processed by cavitation in the stream of gas within chamber 302.

The outlet 308 may be configured to emit the exhaust gas and processed material from chamber 302 and into storage 108 (FIGS. 1 and 2). The outlet 308 may be disposed at an opposite end of chamber 302 as gas inlet 304 and material inlet 306. The outlet 308 may be disposed on longitudinal axis 310 of chamber 302. As particle size of the solid process material is reduced, those particles may migrate toward outlet 308. The outlet 308 may be coupled to tank 218 of storage 108 (FIG. 2) configured to trap processed material emitted from outlet 308.

In some implementations, outlet 308 may include an outlet nozzle disposed within outlet 308. The outlet nozzle may be configured to pressurize chamber 302. The outlet nozzle may be configured to effectuate a rapid cooling of processed material exiting the chamber. According to some implementations, such rapid cooling may reduce or minimize back reactions of metals and/or other chemicals susceptible to back reactions. In some implementations, the outlet nozzle may include a venturi tube.

In FIG. 4, in some implementations, reactor 104 may incorporate heating component 202 configured to provide heat to chamber 302. The heating component 202 may include one or more of a gas burner, an electrical coil, an induction heater, a dielectric heater, a radiofrequency heater, a microwave heater, a steam jacket, a molten salt bath, and/or other components configured to provide heat.

According to some implementations, reactor 104 may include a ventilation component 322 (FIG. 4) configured to vent gas from a region surrounding chamber 302. The ventilation component 322 may include one or more of an exhaust fan, a flue or other duct work, a venturi eductor, a turbine to recuperate gas pressure and/or heat, and/or other components configured to vent gas.

In some implementations, heating component 202 may be omitted. For example. In some implementations, if a portable reaction system or other constraints limit the size of the system 100, then air and/or oxygen may be added to the process gas which my give any degree of heat required for a reaction. In some implementations, this heat may be generated within the reaction chamber and may obviate the need for external heating (e.g., via heating component 202). The degree of heating may be readily controlled by balancing the temperature of the process gas to be in a range of 50° C.-1200° C. and/or other temperature range and/or the pressure to be in a range of 100 KPa-35 MPa and/or other range.

The system 100 and/or reactor 104 may include one or more sensors 324. A given sensor 324 may provide a signal conveying information related to one or more parameters associated with system 100 and/or reactor 104. A given signal may be used to facilitate determination and/or presentation of a corresponding parameter. Exemplary parameters may include one or more of a temperature, a pressure, a velocity (e.g., a velocity of a gaseous vortex within chamber 302), a flow rate of material through material inlet 306 and/or outlet 308, a flow rate of gas through gas inlet 304, a presence of shockwaves and/or cavitations within chamber 302, a voltage, a current, an analysis of gas species exiting the reactor, and/or other parameters associated with reactor 104.

Figure 8:
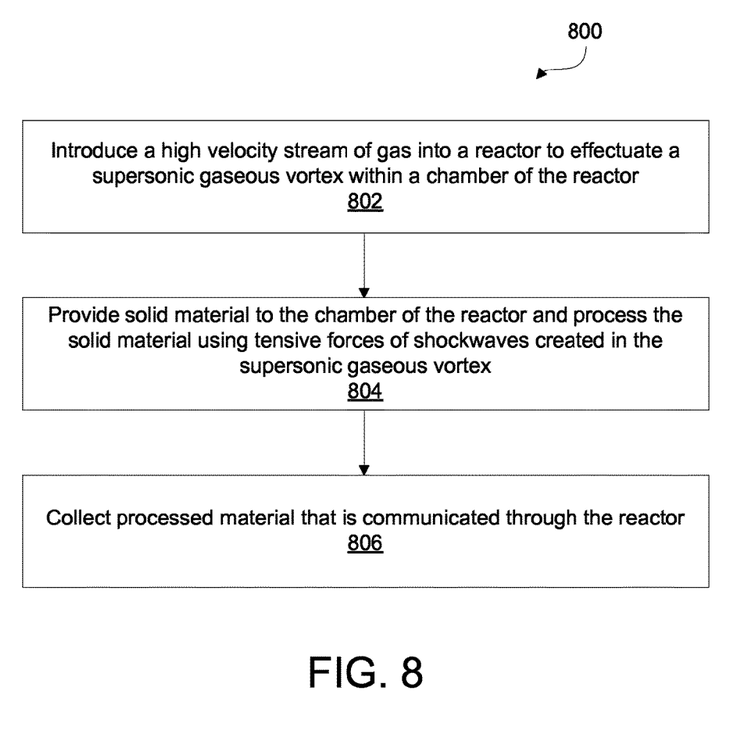
FIG. 8 illustrates a method of processing solid materials, in accordance with one or more implementations.

FIG. 8 illustrates a method 800 of processing solid materials. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below are not intended to be limiting. In some implementations, method 100 may be implemented using a system for processing solid materials the same or similar to system 100 presented herein (shown in FIG. 1).

Referring now to method 800 in FIG. 8, at an operation 802, a high-velocity stream of gas may be introduced into a reactor. The reactor may have a chamber, a solid material inlet, a gas inlet, and an outlet. The high-velocity stream of gas may be introduced into the chamber of the reactor through the gas inlet. The high-velocity stream of gas may effectuate a supersonic gaseous vortex within the chamber. The reactor may be configured to facilitate chemical reactions and/or comminution of solid feed material using tensive forces of shockwaves created in the supersonic gaseous vortex within the chamber. In some implementations, operation 802 may be performed using a gas source and a reactor the same or similar as gas source 106 and reactor 104 (shown in FIG. 1 and described herein).

At an operation 804, solid materials for processing may be provided into the chamber through the solid material inlet. The solid material may be processed within the chamber by nonabrasive mechanisms facilitated by the shockwaves within the chamber. In some implementations, operation 804 may be performed using a solid material feeder the same or similar to solid material feeder 102 (shown in FIG. 1 and described herein).

At an operation 806, processed materials that are communicated through the outlet of the reactor may be collected. In some implementations, operation 806 may be performed using storage the same or similar to storage 108 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for processing solid materials, the system comprising:
   a solid material feeder;
   a reactor having a chamber, a solid material inlet, a gas inlet, and an outlet, the reactor being configured to facilitate chemical reactions and comminution of solid feed material using tensive forces of shockwaves in a supersonic gaseous vortex within the chamber, the solid material feeder being configured to provide solid material into the chamber of the reactor through the solid material inlet, the solid material being processed within the chamber by nonabrasive mechanisms facilitated by the shockwaves within the chamber, the outlet including a venturi tube configured to (1) pressurize the chamber and (2) effectuate a rapid cooling of the processed solid material exiting the reactor to reduce occurrences of back reactions;
   a gas source configured to provide a stream of gas to the gas inlet; and
   storage configured to collect processed material that is communicated through the outlet of the reactor;
   wherein the gas inlet includes an inlet nozzle that is structured such that the stream of gas provided by the gas source is accelerated to a supersonic speed and shockwaves are emitted from the inlet nozzle into the chamber, the inlet nozzle being further structured such that shockwaves introduced into the chamber are controlled to occur at different frequencies.

2. The system of claim 1, comprising:
a heating component configured to provide heat to the chamber of the reactor.

3. The system of claim 1, wherein the solid material feeder comprises a source of solid material and a conveyor that advances the solid material through the solid material inlet into the chamber.

4. The system of claim 1, wherein the gas source comprises:
a heater heated by a heat source; and
a fluid pump configured to introduce a fluid into the heater, wherein the heater is configured to elevate the temperature and pressure of the fluid, such that communicating the fluid from the heater to the gas inlet facilitates the high-velocity stream of gas.

5. The system of claim 1, wherein the storage comprises a tank in fluid communication with a vacuum source, the vacuum source being configured to create a vacuum pressure within the tank to draw processed material from the outlet of the reactor.

6. The system of claim 1, wherein the chamber has a substantially circular cross-section centered on a longitudinal axis that is normal to the cross-section.

7. The system of claim 6, wherein a radius of the substantially circular cross-section of a portion of the chamber continuously decreases at an end of the chamber proximal to the outlet, and wherein the continuous decrease of the radius of the substantially circular cross-section of the chamber is configured to cause an acceleration of a rotational speed of the gaseous vortex.

8. The system of claim 1, wherein the gas inlet of the reactor is disposed and arranged so as to effectuate a vortex of the stream of gas circulating within the chamber, the vortex rotating at a supersonic speed about a longitudinal axis of the chamber.

9. The system of claim 8, wherein the gas inlet is disposed so that the stream of gas is directed substantially perpendicular to the longitudinal axis of the chamber.

10. The system of claim 1, wherein the inlet nozzle is selected from the group consisting of a Hartmann-Sprenger tube, a Hartmann generator, and a Hartmann oscillator.

11. The system of claim 1, wherein the gas inlet further comprises an annular cavity disposed about the inlet nozzle, the annular cavity being structured to resonate the stream of gas emitted from the inlet nozzle.

12. The system of claim 1, wherein the inlet nozzle is structured to radiate more than one kilowatt of acoustic power.

13. The system of claim 1, wherein the inlet nozzle is structured to radiate more than one megawatt of acoustic power.

14. The system of claim 1, wherein shockwaves occur at a frequency in the range of 5 kilohertz to 500 kilohertz.

15. The system of claim 1, wherein the nonabrasive mechanisms that process the solid material within the chamber include cavitation.

16. The system of claim 1, wherein the inlet nozzle includes one or more resonator cylinders structured such that gas pressure pulses resonate within the one or more resonator cylinder to induce shockwaves within inlet nozzle.

17. A method of processing solid materials, the method comprising:
introducing a high-velocity stream of gas into a reactor having a chamber, a solid material inlet, a gas inlet, and an outlet, the high-velocity stream of gas being introduced into the chamber of the reactor through the gas inlet to effectuate a supersonic gaseous vortex within the chamber, the reactor being configured to facilitate chemical reactions and comminution of solid feed material using tensive forces of shockwaves created in the supersonic gaseous vortex within the chamber;
controlling the shockwaves introduced into the chamber to occur at different frequencies;
providing solid material into the chamber through the solid material inlet, and wherein material is processed within the chamber by nonabrasive mechanisms facilitated by the shockwaves within the chamber, the outlet including a venturi tube configured to (1) pressurize the chamber and (2) configured to effectuate a rapid cooling of the processed solid material exiting the reactor to reduce occurrences of back reactions; and
collecting processed material that is communicated through the outlet of the reactor.

18. The method of claim 17, comprising:
providing heat to the chamber of the reactor.

19. The method of claim 17, wherein providing solid material into the chamber comprises advancing solid material through the solid material inlet into the chamber.

20. The method of claim 17, wherein introducing a high-velocity stream of gas into the chamber comprises:
heating a heater; and
introducing a fluid into the heater, wherein the heater is configured to elevate the temperature and pressure of the fluid, such that communicating the fluid from the heater to the gas inlet facilitates the high-velocity stream of gas.

21. The method of claim 17, wherein the processed material is collected in a tank communicating with a vacuum source, the vacuum source being configured to create a vacuum pressure within the tank to draw processed material from the outlet of the reactor.

22. The method of claim 17, wherein the chamber has a substantially circular cross-section centered on a longitudinal axis that is normal to the cross-section.

23. The method of claim 22, wherein a radius of the substantially circular cross-section of a portion of the chamber continuously decreases at an end of the chamber proximal to the outlet, and wherein the continuous decrease of the radius of the substantially circular cross-section of the chamber is configured to cause an acceleration of a rotational speed of the gaseous vortex.

24. The method of claim 17, wherein the gas inlet of the reactor is disposed and arranged so as to effectuate a vortex of the stream of gas circulating within the chamber, the vortex rotating at a supersonic speed about a longitudinal axis of the chamber.

25. The method of claim 24, wherein the gas inlet is disposed so that the stream of gas is directed substantially perpendicular to the longitudinal axis of the chamber.

* * * * *